United States Patent [19]

Stammelman

[11] Patent Number: 5,261,352
[45] Date of Patent: Nov. 16, 1993

[54] HEATED PLACE FOR ANIMALS

[76] Inventor: Joseph Stammelman, 10 Ann Blvd., Spring Valley, N.Y. 10977

[21] Appl. No.: 783,511

[22] Filed: Oct. 28, 1991

[51] Int. Cl.⁵ ............................................... A01J 1/00
[52] U.S. Cl. ................................................. 119/28.5
[58] Field of Search .......................... 119/5, 28.5, 29; 219/212, 217, 385, 520, 521, 200, 201, 523; 47/68, 69

[56] References Cited

U.S. PATENT DOCUMENTS

| | | | |
|---|---|---|---|
| 3,597,585 | 8/1971 | Ohno | 219/201 |
| 3,758,747 | 9/1973 | Rohr | 219/212 |
| 3,796,858 | 3/1974 | Cohn | 119/5 X |
| 3,808,403 | 4/1974 | Kanaya et al. | 219/212 X |
| 4,163,145 | 7/1979 | Neff | 119/5 X |
| 4,234,780 | 11/1980 | McCarthy | 219/200 |
| 4,378,488 | 3/1983 | Jager | 119/5 X |
| 4,577,094 | 3/1986 | Mills | 219/212 X |
| 4,607,154 | 8/1986 | Mills | 219/212 X |
| 4,616,124 | 10/1986 | Greenhalgh | 219/212 X |
| 5,073,688 | 12/1991 | McCormack | 219/212 |

*Primary Examiner*—Gene Mancene
*Assistant Examiner*—Thomas Price
*Attorney, Agent, or Firm*—Philip Furgang

[57] ABSTRACT

A heated place is provided for cold-blooded animals or creatures, such as snakes, and the like by casting or molding a rock-like formation with a base, sides, and ridge-like top in proximity at least one location and having a predetermined contour. The rock-like formation and its contour are selected to provide a suitable and relatively comfortable habitat and place for the creature to set, rest and/or sleep. A heating device is provided to heat the area of the rock-like formation particularly at and about the contour of its ridge-like top. The heating device is embedded within the material of the rock-like formation proximate the ridge-like top so as to follow its contour. The heating filament or element of the heating device is encapsulated in silicon which is then encapsulated in an aluminum braid sheath. An epoxy encapsulation is provided at the place where the leads connected to a source of electrical power. Electrical resistors may be electrically connected in parallel with the heating element and similarly encapsulated.

43 Claims, 1 Drawing Sheet

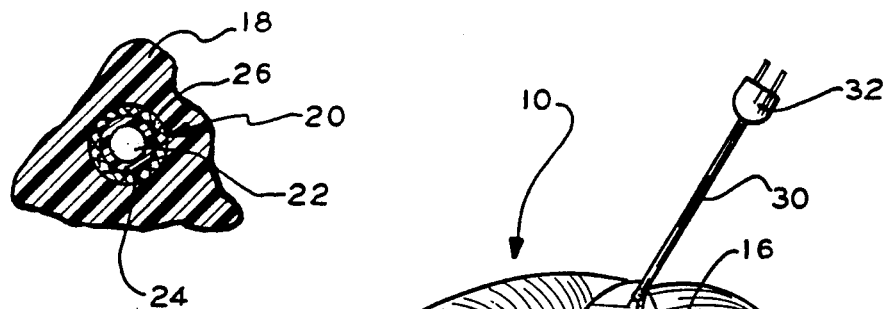
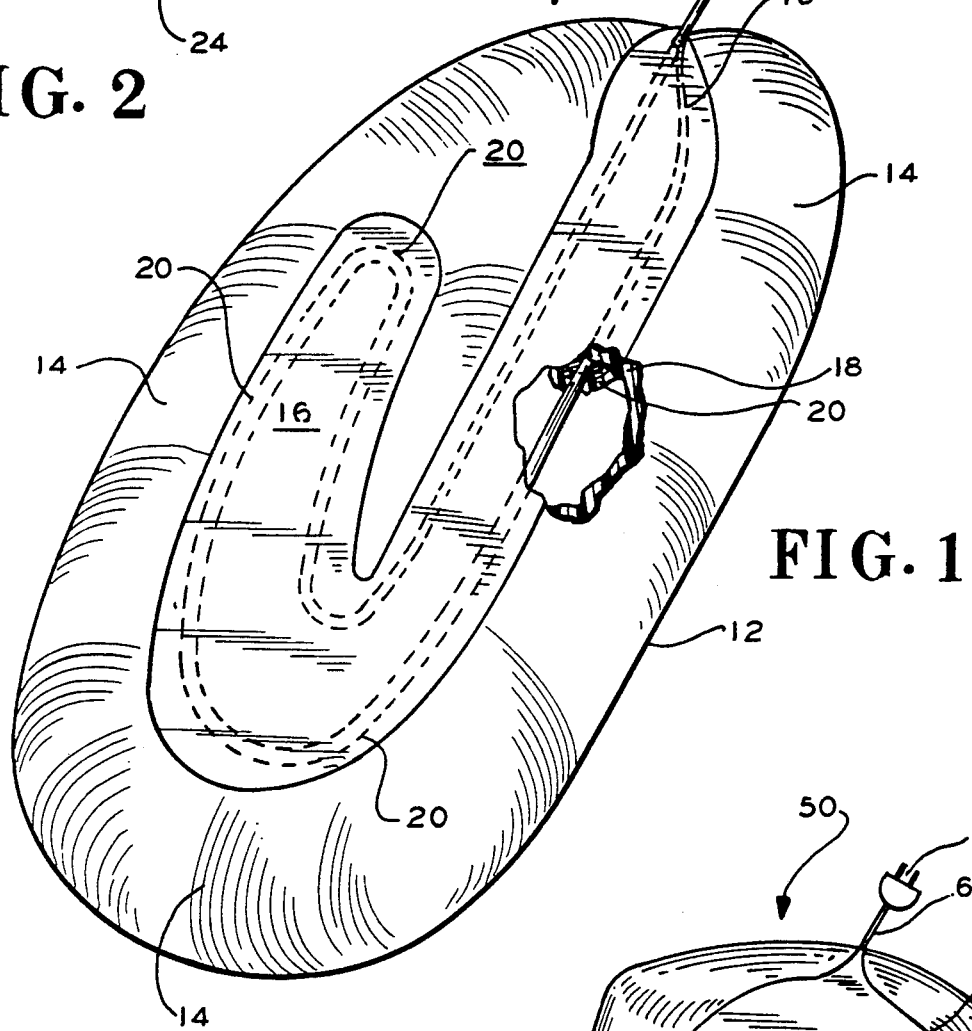
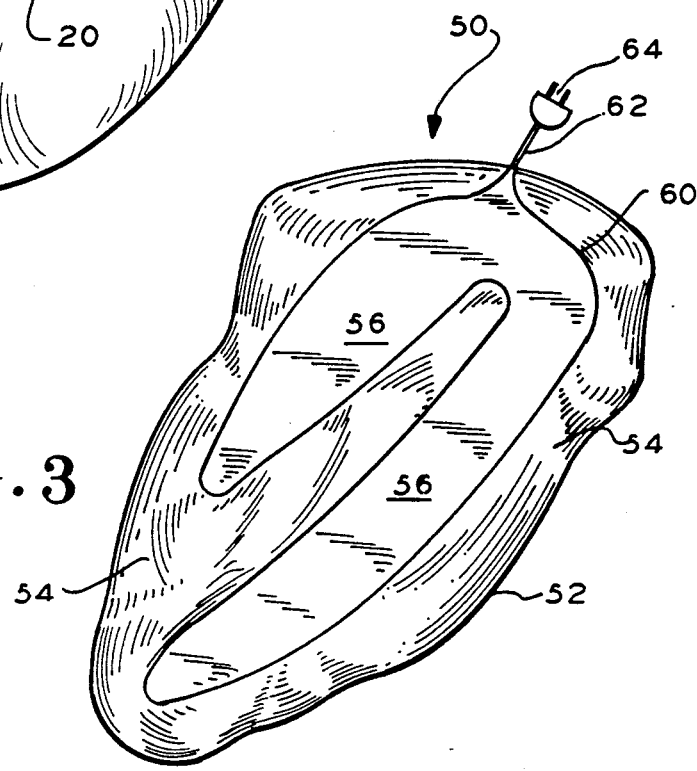
FIG. 2
FIG. 1
FIG. 3

HEATED PLACE FOR ANIMALS

BACKGROUND OF THE INVENTION-FIELD OF APPLICATION

This invention relates to devices and things for animals; and more particularly to devices which provide a heated place for animals and especially reptiles and other cold-blooded creatures.

BACKGROUND OF THE INVENTION-DESCRIPTION OF THE PRIOR ART

Animals, especially those kept as pets, quite often find themselves resident for most of their time in a home, zoo or other habitat where they are provided with shelter, food and their basic necessities of life. Some animals, like fish, birds, reptiles, etc., are usually further restricted in their habitat to tanks, bowls, cages and similar enclosed spaces sometimes to protect the animal and sometimes to protect the keepers and visitors.

Different types of animals require different things in or about their places of habitat to facilitate or enhance their daily lives or possibly just to make life for the animal and the owner more enjoyable. Fish need to live in water that is often aerated and heated. Birds like perches and reptiles, such as snakes and lizards, like rocks to move over, onto and around.

Sometimes the habitat or animal place, or part of that place, needs to be warmed or heated. This is especially so if the animal is young or, as in the case of tropical fish, the natural habitat is usually warm or, as in the case of cold-blooded animals, a nice warm place to lie down, rest and sleep is sought by the animal.

Heating devices for animal places are known, for example, as shown and described in U.S. Pat. No. 2,617,005 granted on Nov. 4, 1952 to H. R. Jorgensen for "Warming Device". However, the heating elements of this type device are merely protected by a thin asbestos sheet and if cracks or breaks occur and/or if the device should get wet the animal using the device could receive electrical shocks or possibly even get electrocuted. Other heated or warmed devices for animals are shown and described in U.S. Pat. No. 2,842,651 granted on Jul. 8, 1958 to C. H. Neely for "Portable Heated Animal Bed"; in U.S. Pat. No. 2,866,066 granted on Dec. 23, 1958 to C. H. Neely for "Animal Bed"; and in German Offenlegungsschrift 24 28 233 dated on Jan. 2, 1976 to F. Armbruster. These patents, however, also do not provide an electrically safe heating or warming device since the heating elements of Neely (U.S. Pat. No. 2,842,651) are merely in fluid or sand while the heating elements of Neely U.S. Pat. No. 2,866,066 are merely in concrete; all of which can break, crack or otherwise expose the animal to shock and possibly even electrocution.

A heating device such as that shown and described in U.S. Pat. No. 2,963,565 granted on Dec. 6, 1960 to F. C. Moore et al for "Heater For Animal Pens" places the electrical conductors in electrical contact with a conductive paint to provide a source of heat even if cracks develop. However, this type of device would most surely electrically shock and possibly injure animals that might contact the electrically conductive surface of the device. A prior art heating device for a puppy is shown and described, for example, in U.S. Pat. No. 2,859,731 granted on Nov. 11, 1958 to V. Sutton for "Puppy Comforter" and for a pet in U.S. Pat. No. 3,125,663 granted on Mar. 17, 1964 to R. D. Hoffman for "Heated Pet Bed"; but such devices incorporate soft material cover elements for the heating elements and if these soft material covers wear or are chewed by the animal and if they get wet damaging electrical shocks and electrocution may result.

Pet habitat heating elements have also been embedded in plastic and hidden behind a decorative rock-like facing as shown and described in U.S. Pat. No. 3,059,091 granted on Oct. 16, 1962 to T. C. Wenzel for "Combination Heater, Aerator and Backdrop For Aquarians". However, this application is for a backdrop and not a place upon which the pet might stay or rest. In addition, if cracks developed in the plastic, as time and use might provide, the electricity being conducted through the heating elements could flow, under damp or wet conditions, to and even through the pet.

U.S. Pat. No. 4,332,214 granted on Jan. 1, 1982 to L. Cunningham for "Heated Bed For Animals" shows and describes a protective, bed-like environment for care and treatment of sick, injured, weak or young animals including reptiles. The plastic bed is double shelled and houses a body of water that is heated from an underlying heating wire that is sandwiched between a metal cover plate and a piece of metal foil. The animal would most surely be trapped and ill at ease by this non-natural and confining habitat for reptile-like creatures since reptiles like to rest upon and crawl about rock-like formations. The use of water would also add significantly to the weight of this type of habitat rendering it even more undesirable for day to day use. A rock-like formation particularly provided for reptiles is shown and described in U.S. Pat. No. 4,234,780 granted on Nov. 18, 1980 to G. M. McCarthy for "Resting Place For Reptiles In Captivity" but this device for use in a vivarium merely embeds a heating coil in a concrete rock-like formation. The McCarthy coil is disposed in a lower corner of the formation and will thus require the generation of considerable heat to penetrate the relatively large thickness of concrete. In doing so, if at all, its positioning would appear to be such that some of the formation will not be evenly heated. In addition, if the concrete formation cracks, as concrete will, and if water or moisture is present, as it might be in a reptile vivarium, the reptile could be subject to electrical shock or even to electrocution.

It is also known to place a series of resistors in an artificial rock wherein each resistor is connected in parallel. However, in such constructions, the heated rock displays an uneven distribution of heat, primarily at the location of the resistors. Further, the resistors are uninsulated resulting in possible shock or the killing of the pet.

SUMMARY OF THE INVENTION

It is therefore an object of this invention to provide a new and novel place for an animal to set rest or the like.

It is another object of this invention to provide a new and novel heated rock-like formation upon which an animal might set, rest or the like.

It is yet another object of this invention to provide a new and novel heated rock-like formation for cold-blooded animals such a reptiles or snakes.

It is still another object of this invention to provide a new and novel heated rock-like formation or place for use in a vivarium.

It is yet still another object of this invention to provide a new and novel rock-like formation formed with contours from plastic material and with insulated and encapsulated heating conductors disposed in proximity to the contours to provide a heated place for reptiles and the like to set, rest, etc.

Other objects, features and advantages of the invention in its details of construction and arrangement of parts will be seen from the following description of the preferred embodiments when considered with the drawing and from the appended claims.

BRIEF DESCRIPTION OF THE DRAWING

In the drawing:

FIG. 1 is a schematic isometric showing of a rock-like formation incorporating the instant invention;

FIG. 2 is a cross-section through a piece of the rock-like formation of FIG. 1 showing the heating element therefore and which incorporates the instant invention; and FIG. 3 is a plan view, in schematic, of a rock-like formation similar to that of FIG. 1 but showing an alternative configuration incorporating the instant invention.

DESCRIPTION OF THE PREFERRED EMBODIMENTS

With reference to FIG. 1 there is generally shown at 10 a rock-like formation of generally oval configuration at its base 12 which tapers upwardly and inwardly about its sides 14 to crest along a ridge 16. The configuration of rock-like formation 10 is selected to accommodate a cold-blooded animal or creature such as a snake, lizard, reptile or the like and for disposition within a habitat for that animal or creature such as a vivarium. The particular configuration may be selected depending upon the size or sizes of the animals to be housed in the habitat or place the kind of animal or animals and the number of such animals to inhabit the habitat or place. The particular circumferential configuration of the base of the rock-like formation of the sides that raise up from the base and of the top or ridge may also be selected according to the purported likes and dislikes of the animal to inhabit the location where rock-like formation 10 is to be disposed.

Rock-like formation 10 is formed from a suitable plastic which is cast or molded into the selected configuration. The thickness 18 of walls 14 and ridge 16 of formation 10 are selected to provide a sturdy formation able to support the weight of the animals or creatures that will utilize rock-like formation 10. The thickness 18 of walls 14 and ridge 16 is also selected to have embedded therewithin a heating conductor assembly 20 (FIGS. 1 and 2) that is disposed therewithin as shown in dashed lines in FIG. 1 and so as to follow the contour of ridge 16. The disposition of heating conductor assembly 20 so as to follow the contour of ridge 16 and its disposition embedded within the material of formation 10 but in relatively close proximity to the surface of ridge 16 effects a relatively uniform heating of the material of formation 10 proximate ridge 16. The configuration of formation 10 and ridge 16 are selected so that the animal or creature utilizing rock-like formation 10 as a place to set, rest or sleep will position itself proximate ridge 16 to be thereby warmed by the heat given off by heating assembly 20 when connected to a source of electrical power and turned on.

Heating assembly 20 includes a conventionally available heating element or filament 22 (FIG. 2) encapsulated within a jacket sheath or covering 24 of plastic material such as silicon which is, in turn, encapsulated within a jacket sheath or covering 26 of aluminum braid. A set of leads 30 (FIG. 1) connect heating assembly 20 to a plug 32 for connecting heating assembly 20 to a source of electrical power. The set of leads 30 are encapsulated in a suitable non-conductive epoxy. Thus heating assembly 20, due to its encapsulation in silicon and then in aluminum braid and with its epoxy covering for its leads, comprises a source of heating that will not easily crack and expose the animal or other creature to electrical shock and electrocution even if rock-like formation 10 should get wet and even if rock-like formation 10 should crack at or about its ridge 16.

If desired an on-off switch (not shown) may be provided for heating assembly 20, possibly proximate leads 30; and if desired a suitable and conventional thermostatic control (not shown) may also be provided and electrically connected in circuit as a part of heating assembly 20.

FIG. 3 schematically illustrates another rock-like formation 50, formed of similar materials and in a manner similar to rock-like formation 10. Formation 50 is of generally irregular shaped contour 52 and includes side walls 54 terminating at a ridge 56. A heating assembly 60 is embedded within the material of formation 50 and in a manner similar to heating assembly 20 of FIGS. 1 and 2 and so that its heating filament or element is disposed reasonably proximate the surface of ridge 56. The construction of heating assembly 60 is substantially identical to that of heating assembly 20 in that it includes a heating filament or element encapsulated within a sheath of silicon or other non-conductive plastic material which is, in turn, sheathed by a covering of aluminum braid or other similar material. Heating assembly 60 is relatively longer than that of heating assembly 20 and follows the contours of ridge 56 of formation 50 which is relatively larger than formation 10. Leads 62 of heating assembly 60 are encapsulated in suitable epoxy and serve to connect heating assembly 60 through its plug 64 to a source of suitable electrical energy. An on-off switch and thermostatic control may be included with heating assembly 60.

Rock-like formation 50 and its heating assembly 60 are thus constructed similar to formation 10 and heating assembly 20 of FIGS. 1 and 2 in that heating assembly 60 is disposed in close proximity to ridge 56 to heat the area of formation 50 thereabout and provide a warm place for the reptile while at the same time encapsulating and protection the heating filament or elements of heating assembly 60 from cracking and wet and the animal from electrical shock and electrocution.

The prior art device which employs a number of individual resistors spaced within an artificial rock (but not along its contours, as taught herein) may likewise benefit from the encapsulation of the resistor leads with epoxy and the interconnecting wires being sheathed in aluminum braid or a similar material but does not provide uniform heat.

The device disclosed herein are equally applicable to a heated simulated tree trunk or cave, neither of which is shown.

From the above description it will thus be seen that there has been shown a new and novel heated rock-like formation or place for reptiles and the like which includes a heating construction that is encapsulated to protect the creature from electrical shock and electrocution and provide substantially uniform heating.

It is understood that although I have shown the preferred form of my invention that various modifications may be made in the details thereof without departing from the spirit as comprehended by the following claims.

What is claimed is:

1. A heated place for animals, creatures, and the like, comprising:
   (a) means formed for receiving at least one animal or creature and having a predetermined size, substantially non-planar configuration, and contour and which includes at least one location for the animal or creature to set;
   (b) means for heating by electricity carried by said formation means in proximity at least to said at least one location; and
   (c) means for shielding said heating means comprising non-electrically conductive material to thereby insulate the animal or creature upon said location from shock from said heating means.

2. The heated place of claim 1 wherein said formation means formed for receiving are shaped like at least one rock.

3. The heated place of claim 1 wherein said formation means formed for receiving are tree-trunk in shape.

4. The heated place of claim 1 wherein said formation means formed for receiving are cave-like in shape.

5. The heated place of claim 1, wherein said predetermined size, substantially non-planar configuration and contour provide a rock-like formation having a base, sides and a ridge-like top all formed from plastic.

6. The heated place of claim 5, wherein said rock-like configuration is formed of a predetermined thickness and said means for heating is formed into said thickness and proximate said ridge-like top.

7. The heated place of claim 6, wherein said ridge-like top is of a predetermined contour suitable as a habitat for a cold-blooded creature.

8. The heated place of claim 7, wherein said means for heating is disposed to follow said predetermined contour.

9. The heated place of claim 8, wherein said predetermined contour is suitable for a reptile.

10. The heated place of claim 8, where in said means for heating comprises at least one resistor.

11. The heated place of claim 10, wherein said means for heating comprises a plurality of resistors connected in parallel.

12. The heated place of claim 11, wherein said resistors are encapsulated by a non-electrically conductive material.

13. The heated place of claim 12, wherein said resistors are encapsulated by a sheath of silicon which is, in turn, encapsulated by an aluminum braid sheath.

14. The heated place of claim 8, wherein said means for heating comprises a continuous heating filament.

15. The heated place of claim 14, wherein said heating filament is within said means formed and follows the surface contours thereof to thereby provide substantially even heating throughout said surface.

16. The heated place of claim 6, wherein said means for heating comprises a continuous heating filament.

17. The heated place of claim 16, wherein said heating filament is within said means formed and follows the surface contours thereof to thereby provide substantially even heating throughout said surface.

18. The heated place of claim 1, wherein said means for heating includes a heating filament disposed within said means formed for receiving at least one animal or creature and follows the surface contours thereof to thereby provide substantially even heating throughout said surface.

19. A heated place for animals, creatures, and the like of the type shaped to simulate such typical animal or creature resting places as a rock, tree trunk, cave, or the like, said heated place comprising:
   (a) means formed for simulating the shape and receiving at least one animal or creature and having predetermined size, substantially non-planar configuration, and contour and which includes at least one location for the animal or creature to set; and
   (b) means for heating said means formed for simulating carried within said formation means and substantially following the surface contours of said formation means so as to thereby substantially evenly distribute the heat at the surface of said formation means.

20. The heated place of claim 19 wherein said formation means are shaped like at least one rock.

21. The heated place of claim 20, wherein said rock-like formation is formed of plastic-like material formed in a rock-like configuration with a base, sides and a ridge-like top.

22. The heated place of claim 21, wherein said means for heating comprises a continuous heating filament.

23. The heated place of claim 22, wherein said heating filament is within said rock-like means formed and follows the surface contours thereof to thereby provide substantially even heating throughout said surface.

24. The heated place of claim 19, wherein said means for heating means comprises a continuous heating filament.

25. The heated place of claim 24, wherein said heating filament is within said means formed and follows the surface contours thereof to thereby provide substantially even heating through said surface.

26. A heated place for animals, creatures, and the like, comprising:
   (a) means formed for receiving at least one animal or creature and having a predetermined size, configuration and contour and which includes at least one location for the animal or creature to set;
   (b) means for heating by electricity carried by said formation means in proximity at least to said at least one location; and
   (c) means for shielding said heating means comprising non-electrically conductive material to thereby insulate the animal or creature upon said location from shock from said means for heating;
   (d) said means for shielding comprising a first sheath of plastic non-electrically conductive material covering said heating means, and a second sheath covering said first sheath and formed of a braided material.

27. The heated place of claim 26, wherein said first sheath is formed of silicon.

28. The heated place of claim 26, wherein said first sheath is formed of silicon and said second sheath is formed of braided aluminum.

29. The heated place of claim 28 wherein said means formed are rock-like.

30. The heated place of claim 28 wherein said means formed are tree-trunk in shape.

31. The heated place of claim 28 wherein said means formed are cave-like in shape.

32. The heated place of claim 26 wherein said means formed are rock-like.

33. The heated place of claim 26 wherein said means formed are tree-trunk in shape.

34. The heated place of claim 33, wherein said heating filament is within said means formed and follows the surface contours thereof to thereby provide substantially even heating throughout said surface.

35. The heated place of claim 26 wherein said means formed are cave-like in shape.

36. The heated place for animals of claim 26, including means for providing electrical leads interconnecting said means for heating to a source of electrical power and epoxy means for encapsulating said electrical leads including at least where said electrical leads are interconnected to said means for heating.

37. The heated place for animals of claim 36, wherein said means formed for receiving at least one animal or creature is substantially non-planar.

38. The heated place for animals, creatures, and the like, comprising:
   (a) means formed for receiving at least one animal or creature and having a predetermined size, configuration and contour and which includes at least one location for the animal or creature to set;
   (b) means for heating by electricity carried by said formation means in proximity at least to said at least one location;
   (c) means for shielding said heating means comprising non-electrically conductive material to thereby insulate the animal or creature upon said location from shock from said means for heating;
   (d) means for providing electrical leads interconnecting said means for heating to a source of electrical power, and
   (e) epoxy means for encapsulating said electrical leads including at least where said electrical leads are interconnected to said means for heating.

39. The heated place of claim 14 wherein said formation means are shaped like at least one rock.

40. The heated place of claim 38 wherein said formation means are tree-trunk in shape.

41. The heated place of claim 38 wherein said formation means are shaped like a cave.

42. The heated place of claim 38, wherein said means for heating comprises a continuous heating filament.

43. The heated place for animals of claim 38, wherein said means formed for receiving at least one animal or creature is substantially non-planar.

* * * * *